United States Patent
Diepstraten et al.

(10) Patent No.: US 7,434,223 B2
(45) Date of Patent: Oct. 7, 2008

(54) SYSTEM AND METHOD FOR ALLOWING A CURRENT CONTEXT TO CHANGE AN EVENT SENSITIVITY OF A FUTURE CONTEXT

(75) Inventors: Wilhelmus J. M. Diepstraten, Haghorst (NL); Onno Letanche, Almere (NL)

(73) Assignee: Agere Systems Inc., Allentown, PA (US)

(*) Notice: Subject to any disclaimer, the term of this patent is extended or adjusted under 35 U.S.C. 154(b) by 930 days.

(21) Appl. No.: 10/443,493

(22) Filed: May 22, 2003

(65) Prior Publication Data

US 2004/0236930 A1   Nov. 25, 2004

(51) Int. Cl.
   G06F 9/46   (2006.01)
   G06F 7/38   (2006.01)
   G06F 9/00   (2006.01)
   G06F 9/44   (2006.01)
   G06F 15/00  (2006.01)

(52) U.S. Cl. .......... 718/108; 712/228
(58) Field of Classification Search .......... 718/100
   See application file for complete search history.

(56) References Cited

U.S. PATENT DOCUMENTS

| 6,205,468 | B1 | 3/2001 | Diepstraten et al. |
| 6,243,736 | B1 | 6/2001 | Diepstraten et al. |
| 6,260,150 | B1 | 7/2001 | Diepstraten et al. |
| 6,981,255 | B2 * | 12/2005 | Kanamori .......... 718/100 |

* cited by examiner

*Primary Examiner*—Meng-Ai An
*Assistant Examiner*—Eric C Wai

(57) ABSTRACT

The present invention provides a system and method, operable in a multi-context processor, for allowing a current context to change an event sensitivity of a future context. In one embodiment, the system includes a context control register, accessible to the current context, for receiving event mask data defining the event sensitivity of the future context. The system further includes a context controller, associated with the context control register and invokable from within the current context, that causes the event mask data to be employed in defining a content of an event mask register of the future context.

13 Claims, 3 Drawing Sheets

SYSTEM AND METHOD FOR ALLOWING A CURRENT CONTEXT TO CHANGE AN EVENT SENSITIVITY OF A FUTURE CONTEXT

TECHNICAL FIELD OF THE INVENTION

The present invention is directed, in general, to computer processors and, more specifically, to a system, operable in a multi-context processor, for allowing a current context to change an event sensitivity of a future context.

BACKGROUND OF THE INVENTION

The processors in general-purpose computers, as well as those used in embedded controllers and special purpose processors, are typically programmed to handle multiple programs. To the average user, these computers seem to run all of the programs at the same time. However, these computers typically perform only one task at a time. In order to run all the programs, these computers execute a portion of the first program, then a portion of the second program, and so on for all of the active programs. This gives the user the illusion that all the programs are running at the same time.

In order for the computers to execute a portion of each of the programs, the computers have to save certain information concerning each program. For example, a computer may have to save where in the program the computer was executing, the current values of data that the computer is using in the program, the values of the registers used by the program, and other information about the program or current state of the computer. This allows the computer to reload the saved information for each program and start processing where it left off in that program.

This portion processing alone (also called time slicing), however, cannot respond to interruptions in a timely manner. For example, if a user is running a word processor program and is also downloading a song from the Internet using a browser, the computer may not return to the browser in time to save the next portion of the song that is received, which would result in gaps in the song when played. To overcome this problem, the computers typically have event handling capability. In other words, the computer can stop the normal processing, go handle an interrupt (event) and then return to normal processing. In the above example, when the computer received another portion of the song from the Internet, the computer would stop executing the word processor program and then go save the portion of the song. The computer would then return to continue executing the word processor program.

This event handling capability became more complicated as the complexity of the processors within the computers increased and as processors were dedicated for specific purposes, such as in network controllers. The types of events and the number of events also increased for these dedicated processors. For example, the events could be related to hardware conditions, such as a line available, data available and control signals. The events could also be related to what is called software events. Software events are events similar in nature to hardware events, but are generated by the software and can be related to different conditions, such as processing states. With these ever increasing types of events, the programs that handled these events needed to be able to process only certain events. To accomplish this, the processors have what is called an event mask. The event mask contains flags for each type of event that can be handled by that program. The flags in the event mask could be set to allow the program to handle only a subset of the events. This allowed the programs to be able to perform very specific functions, which resulted in the fast processing of the event.

Fast processing of events is very important, especially as the speed of the networks increase. Missing an event can mean a network packet (message) may be dropped. In addition to the increased speed, the complexity of what has to be accomplished for specific events also increased. One solution commonly employed was to use multiple event handling programs to process the event. This involved one event handling program sending another event handling program information, such as what events to process. However, due to the type of processing involved and how processors allow event handling programs to execute, the event handling programs typically could not communicate with each other directly. FIG. 1 illustrates a flow diagram of how the event handling programs accomplished the passing of information between them. More specifically, FIG. 1 illustrates how to pass and set an event mask of another event handling program.

To accomplish the communication between the event handling programs, the first event handling program would write the information to a memory location that is accessible by any event handling program (also called a global variable) in a step 110. In this example, the information to be passed from the first event handling program is an event mask. The event mask will be used by the second event handling program to set its own event mask. Next, the first event handling program would then issue a software event to the second event handling program in a step 120. The processor would then start the second event handling program in a step 130. Note that the first event handling program has stopped executing.

Next, the second event handling program would read the event mask from the global variable in a step 140. The second event handling program would then write the event mask as its own event mask in a step 150. The processor then sets the event mask of the second event handling program in a step 160. Next, the processor then returns to continue executing the first event handling program in a step 170.

The method illustrated in FIG. 1 indicates that the first event handling program has to stop processing in order to pass information concerning what events to handle to the second event handling program. Then, the second event handling program must perform several steps in order to retrieve the event information and set its own event mask before the first event handling program can continue processing. This type of information passing causes the amount of time required to process an event to be increased. In addition, the switching between event handling programs also causes additional overhead and delay because the processor has to first save processor information concerning the first event handling program, such as the information described above, and then load the processor information for the second event handling program. After the second event handling program finished setting the event mask, the processor has to save the processor information for the second event handling program and then load the processor information for the first event handling program in order to allow the first event handling program to continue processing. Due to the ever increasing speed requirements of networks and the increased complexity of the event handling to accommodate these networks, the above method of passing event information is inadequate.

Accordingly, what is needed in the art is a way to pass event information between event handling programs that overcome the deficiencies of the prior art.

SUMMARY OF THE INVENTION

To address the above-discussed deficiencies of the prior art, the present invention provides a system and method for allowing a current context to change an event sensitivity of a future context in a multi-context processor. In one embodiment, the system, operable in the multi-context processor, includes a context control register, accessible to the current context, for receiving event mask data defining the event sensitivity of the future context. The system further includes a context controller, associated with the context control register and invokable from within the current context, that causes the event mask data to be employed in defining a content of an event mask register of the future context.

The present invention introduces the broad concept of directly influencing the event mask register of another (future) context to allow the contexts to work together to perform a complex task. This advantageously allows a current context to influence, from within the current context, when another context should be sensitive to a given set of events. "Context," for purposes of the present invention, is defined as an independent execution thread and having all processor state information (or any subset thereof, and such as central registers, program counter, activation controls, and pipeline states) that would be of use in restoring the processor to a given state. A "future context," for purposes of the present invention, is defined as context that is not the active context and may include a context in a state that is waiting for an event to happen, a context that is suspended due to a higher priority context being activated or due to execution scheduling, such as time slicing, or a context to be activated.

In another embodiment, the present invention provides a method, operable in a multi-context processor, for allowing a current context to change an event sensitivity of a future context that includes receiving event mask data defining the event sensitivity of the future context from the current context. The method further includes causing the event mask data to be employed in defining a content of an event mask register of the future context and being invokable from within the current context.

The present invention also provides, in one embodiment, a wireless media access controller having multiple contexts that includes: (1) a modem/radio interface that transmits and receives data and control information via an external modem and radio, (2) a host interface that communicates with an external host in a particular protocol, (3) a system memory for storing instructions, data and control information, (4) an instruction decoder that decodes instructions received into the wireless media access controller and corresponding to the multiple contexts, (5) a plurality of registers sets, corresponding to the multiple contexts, that contain operands to be manipulated, (6) an execution core, coupled to the instruction decoder and the plurality of register sets, that executes instructions corresponding to a current context to manipulate ones of the operands, and (7) a subsystem for allowing the current context to change an event sensitivity of a future context. The subsystem includes a context control register, accessible to the current context, for receiving event mask data defining the event sensitivity of the future context. The subsystem further includes a context controller, associated with the context control register and invokable from within the current context, that causes the event mask data to be employed in defining a content of an event mask register of the future context.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 2:
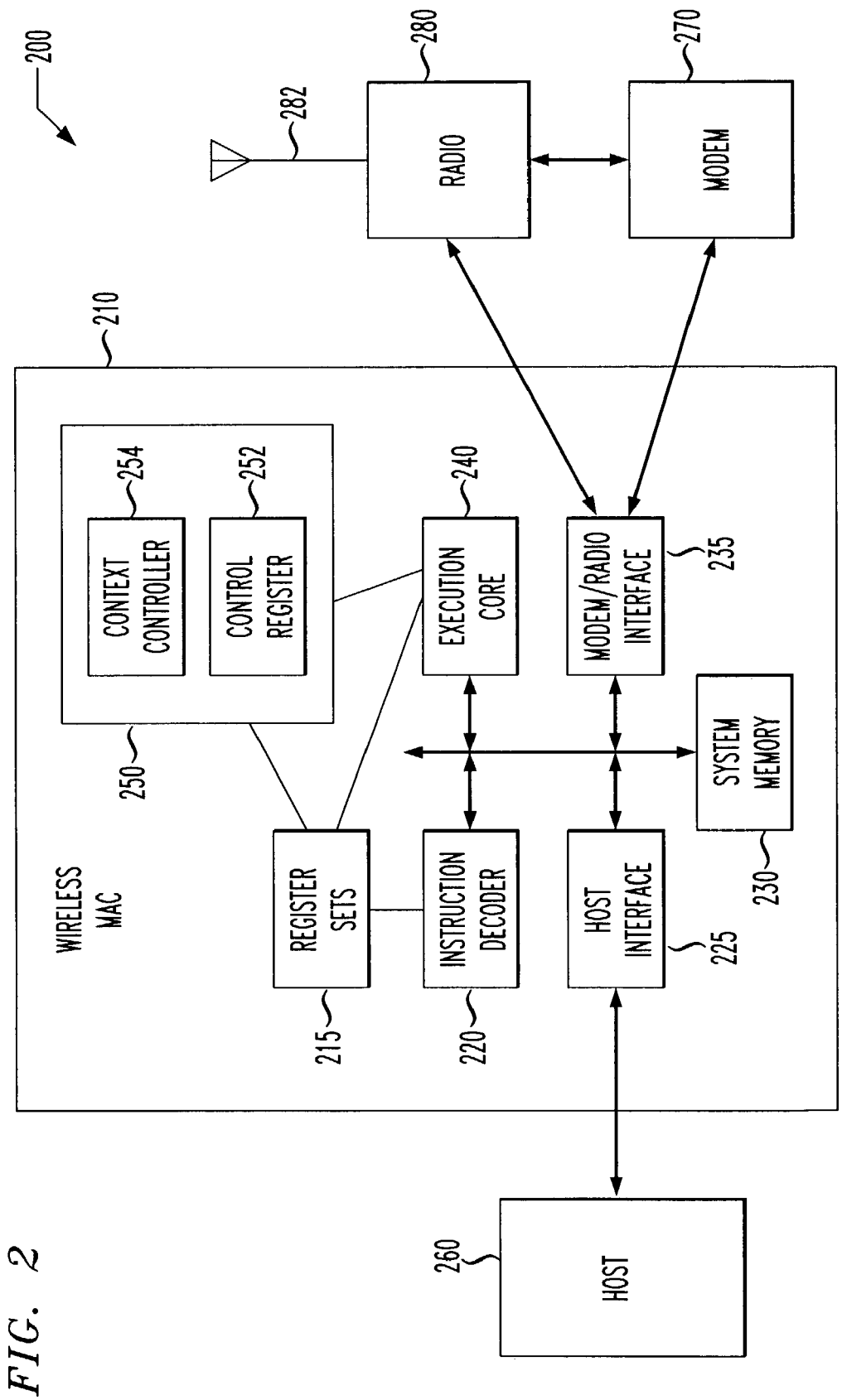
FIG. 2 illustrates a block diagram of a communication system employing an embodiment of a wireless media access controller constructed according to the principles of the present invention.

Referring to FIG. 2, illustrated is a block diagram of a communication system, generally designated 200, employing an embodiment of a wireless media access controller 210, constructed according to the principles of the present invention. In the illustrated embodiment, the communication system 200 includes the wireless media access controller 210, a modem 270 and a radio 280. The communication system 200 is configured to be a wireless access point within a network (not shown) and may be embodied within a Personal Computer Memory Card International Association (PCMCIA) card, a personal computer (PC) card that connects to the internal bus of the PC, an external device, or an embedded system. The communication system 200 is also coupled to a host system 260. The host system 260 may be a conventional personal computer, a portable computer, a personal digital assistant (PDA), or an embedded system. Of course, however, the present invention is not limited to the types of devices and host systems listed above.

The wireless media access controller 210 typically provides the data communication protocols and controls for the physical layer of the Open Systems Interconnection (OSI) model of network communication. In the illustrated embodiment, the wireless media access controller controls the transmission and reception of data over the physical transmission medium, such as radio. One skilled in the art is familiar with the OSI model and physical layer communications over a network. The wireless media access controller 210, in one embodiment, may be the HERMES2 MAC-processor available from Agere Systems, Inc. of Allentown, Pa.

The wireless media access controller 210 is also configured to handle multiple contexts. As stated previously, a context is an independent execution thread of software and may have all the processor state information (or any subset thereof, and such as central registers, program counter, activation controls, and pipeline states) that would be of use in restoring the processor to a given state. For purposes of the present invention, the phrase "configured to" means that the device, the system or the subsystem includes the necessary software, hardware, firmware or a combination thereof to accomplish the stated task or functionality. Also, one skilled in the art is familiar with execution threads in processors. In addition, each of the contexts are typically programmed to handle specific events or sets of events that occur or are generated within the wireless media access controller 210. The contexts may be stored, until execution, in system memory 230 or in some portion of the wireless media access controller 210. The system memory 230 may be embodied within the wireless media access controller or may be embodied in an off-chip device or a combination thereof. The system memory 230 may include volatile and/or non-volatile memory.

In the illustrated embodiment, the wireless media access controller 210 also includes an instruction decoder 220 that is configured to decode instructions received into the wireless media access controller 210. For example, the instruction decoder 220 decodes the instructions that corresponds to the multiple contexts that are executing or will be executing in the future and may receive the instructions from the system memory 230. Associated with the multiple contexts and the instruction decoder 220 is a plurality of register sets 215 that contain operands to be manipulated. The wireless media access controller 210 also includes an execution core 240 that is coupled to the instruction decoder 220 and the plurality of register set 215. The execution core 240 executes instructions corresponding to a current context to manipulate one or more operands in the plurality of register sets 215. Typically, each of the multiple contexts has a corresponding register set that is maintained for that particular context.

Also included in the wireless media access controller 210, in one embodiment, is a host interface 225. The host interface 225 is configured to provide the external bus interface and bus protocol for the host system 260. More specifically, the host interface 225 may provide specific data buffering, handshaking, signaling (e.g., interrupt requests, DMA requests), initialization and sequencing (e.g., buffer descriptor processing) based on the type of bus protocol employed. The bus protocol may be PC Card (also known as PCMCIA card), CardBus (advanced PC Card), Peripheral Component Interconnect (PCI), universal serial bus (USB), or a proprietary bus protocol. The wireless media access controller 210 also includes a modem/radio interface 235. The modem/radio interface 235 provides the external input/output (I/O) interface and I/O protocol for communication over the physical transmission medium of the network. In the illustrated embodiment, the modem/radio interface 235 is coupled to the modem 270 and the radio 280, and provides specific data buffering, formatting (e.g., serialization, bit stuffing, etc.), coding (e.g., CRC generation), and timing resources required by the transmission protocol employed over the radio 280. The modem 270 may be conventional integrated modem used in radio communications and the radio 280 may be a conventional integrated radio used for wireless network communications. The radio 280 is also coupled to a conventional antenna 282 that is appropriate for the type of radio employed.

The wireless media access controller 210, in one embodiment, includes a subsystem 250 for allowing a current context executing in the wireless media access controller 210 to change an event sensitivity of a future context. The subsystem 250 includes a context control register 252 and a context controller 254. The context control register 252 is accessible to the current context executing in the wireless media access controller 210 and receives event mask data from the current context. The event mask data defines the event sensitivity of the future context. For purposes of the present invention, "event sensitivity" means which events the context or program will respond to or will cause the context or program to be activated or flagged for execution. In another embodiment, the context control register 252 may also receive context select data that defines the future context whose event sensitivity will be defined by the received event mask data. In a related embodiment, the context select data may define a future context or the current context, which provides a more efficient function calling mechanism for the current context.

The context controller 254 may select and prioritize events enabled to activate the contexts within the wireless media access controller 210. The context controller 254 may also perform preemptive and/or time-sliced activation of the contexts within the wireless media access controller 210 to handle pending events. In the illustrated embodiment, the context controller 254 is associated with the context control register and invokable from within the current context executing in the wireless media access controller 210. When the context controller 254 is invoked to change the event sensitivity of a future context, the context controller 254 causes the event mask data in the context control register to be employed in defining a content of an event mask register of the future context. In a related embodiment, the context controller 254 may cause the event mask data to be transferred from the context control register 252 into the event mask register of the future context. One skilled in the art is familiar with event mask registers and how they define event handling for a particular context or program. For addition background information on context switching and context controller, see U.S. Pat. No. 6,243,736 to Diepstraten, et al., issued Jun. 5, 2001, entitled "CONTEXT CONTROLLER HAVING STATUS-BASED BACKGROUND FUNCTIONAL TASK RESOURCE ALLOCATION CAPABILITY AND PROCESSOR EMPLOYING THE SAME," which is incorporated herein by reference as if reproduced herein in its entirety.

In addition, the context controller 254 may define the context of the event mask register of the future context without causing a context switch. This advantageously allows the current context to define the event sensitivity of another context and continue executing without having to wait for the another context to perform several steps in order to set its own event mask register as was done in the prior art. See FIG. 1 for a description of how event mask passing was performed in the prior art. In another embodiment, the context controller 254 may cause the event mask data from the context control register 252 to be employed in defining the context of the event mask register of the future context as the wireless media access controller 210 switches to the future context. In yet another embodiment, the context controller 254 may further cause the context select data, if available, to be employed in determining the future context whose event mask register will be defined.

Of course, however, the subsystem 250 of the present invention is not limited to be operable in a wireless media access controller. In another embodiment, the subsystem 250 may be a system that is operable in a multi-context processor, such as a media access controller. In yet another embodiment, the subsystem 250 may be a system that is operable in a microprocessor or a reduced instruction set computer (RISC) processor having multi-context capability. In other embodiments, the subsystem 250 may be a system that is operable in any type of computer system having multi-context capability.

The illustrated embodiment of the wireless media access controller 210 does not illustrate all of the inter-connections between the elements. Of course, however, the present invention is not limited to the exact layout and specific elements illustrated in FIG. 2. In other embodiments, the wireless media access controller 210 may have additional or different elements than described above.

Figure 3:
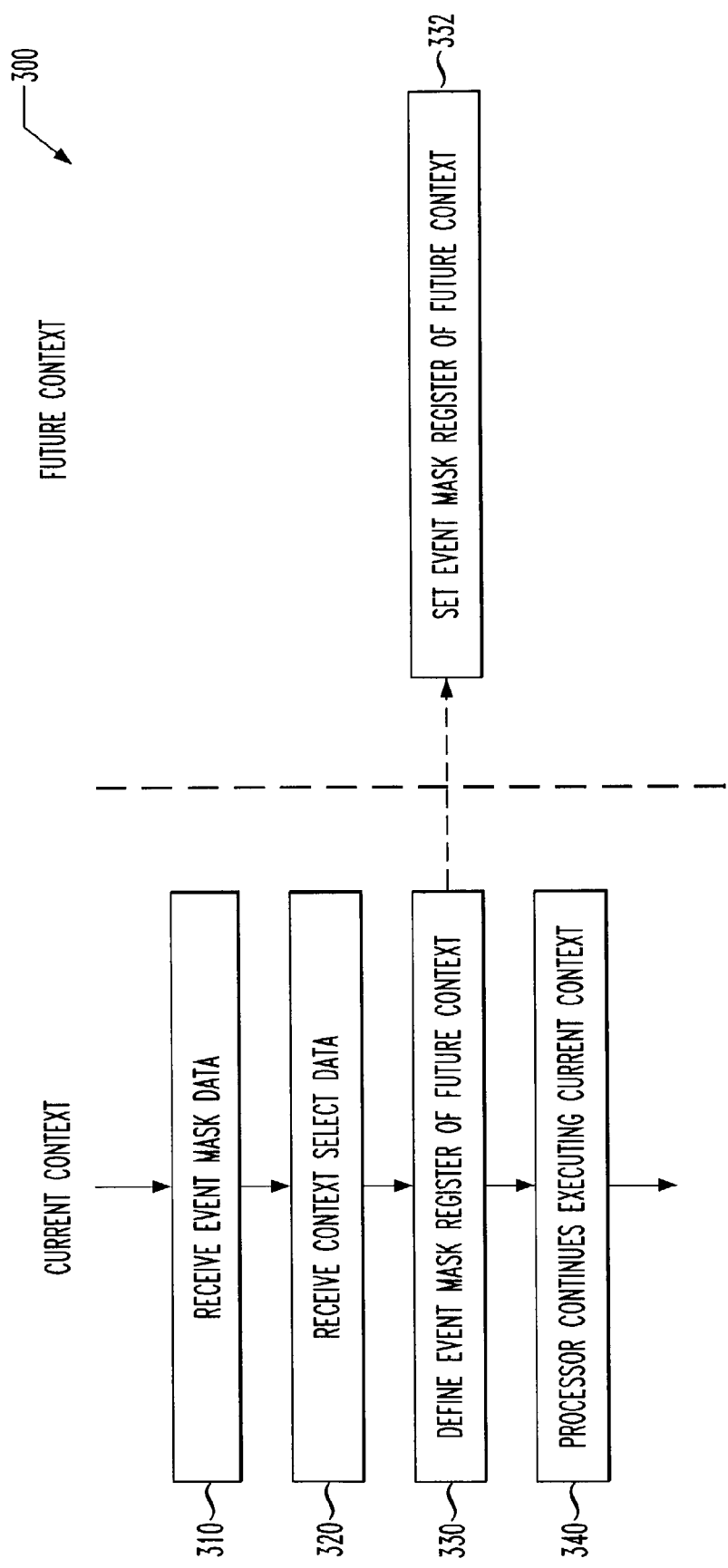
FIG. 3 illustrates a flow diagram of an embodiment of a method, operable in a multi-context processor, for allowing a current context to change an event sensitivity of a future context conducted according to the principles of the present invention.

Turning now to FIG. 3, illustrated is a flow diagram of an embodiment of a method, generally designated 300, operable in a multi-context processor, for allowing a current context to change an event sensitivity of a future context conducted according to the principles of the present invention. The multi-context processor may be a wireless media access controller. In another embodiment, the multi-context processor may be a media access controller. In yet another embodiment, the multi-context processor may be a microprocessor or a RISC processor. Of course, however, the present invention is not limited to the processors listed above. In other embodiments, the method 300 may be operable in other types of processors and/or computers having multi-context capability.

FIG. 3 illustrates an exemplary execution flow in a current context verses a future context. The current context is executing until the current context desires to change the sensitivity of the future context, at such time the method 300 of the present invention is invoked. The method 300 first receives event mask data from the current context in a step 310. The event mask data defines the event sensitivity of the future context.

Next, the method 300 may receive context select data from the current context in a step 320. The context select data defines the future context whose event sensitivity will be defined by the event mask data received in the step 310. The context select data, in a related embodiment, may also allow the current context to define its own event sensitivity or the event sensitivity of the future context. The method 300 then causes the event mask data to be employed in defining the event mask register of the future context, which is invokable from within the current context, in a step 330. The method 300, in another embodiment, may also cause the context select data to be employed in determining the future context.

The method 300 then sets the event mask register of the future context in a step 332. It should be noted that the defining and/or setting of the event mask register occurs without stopping the execution flow of the current context. The dashed arrow pointing to step 332 indicates that the event mask register of the future context is changed. The dashed arrow and the step 332 does not indicate that the changing of the event mask register of the future context is done within or by the future context. Next, the processor continues to execute the current context in a step 340.

Figure 1:
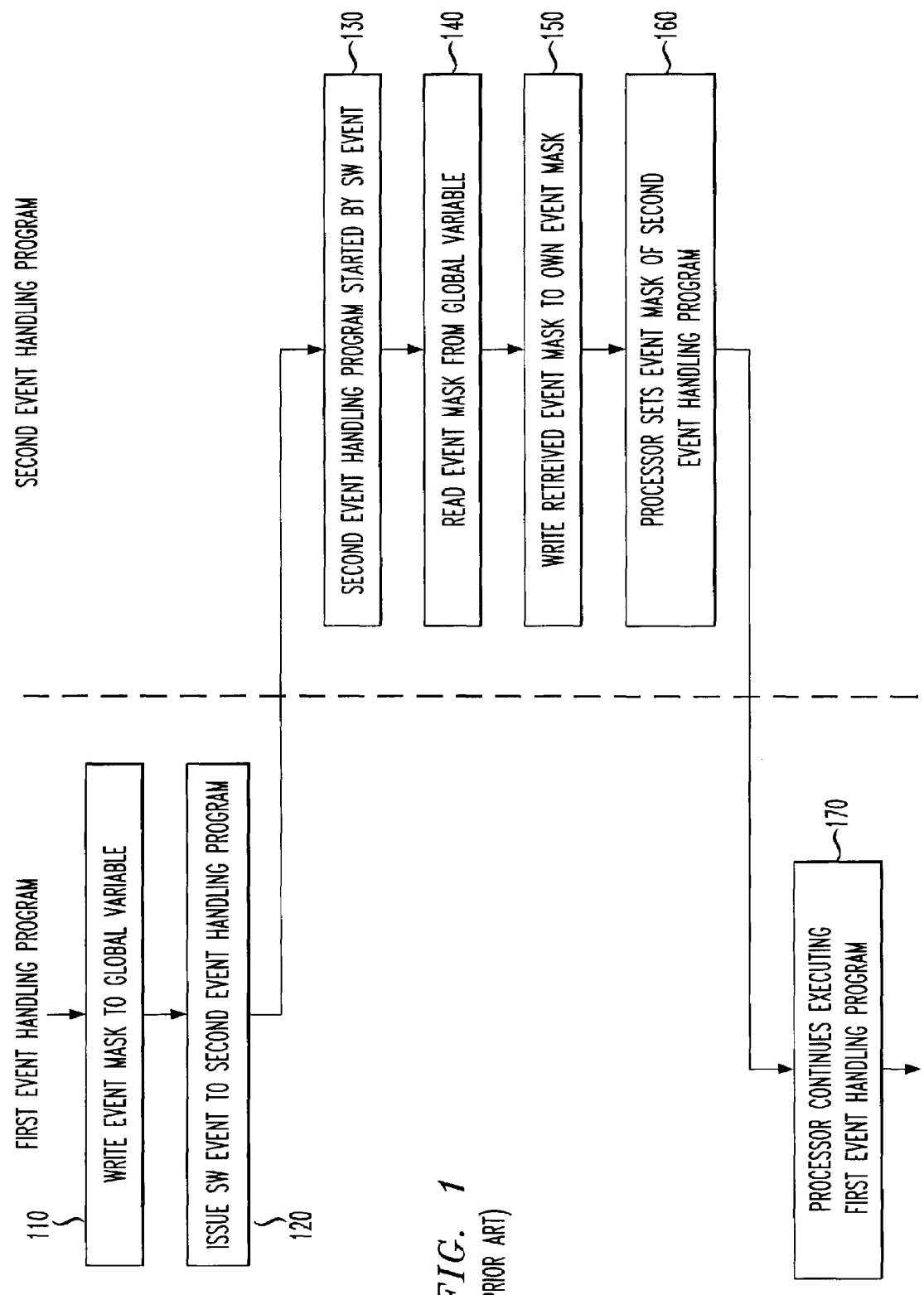
FIG. 1 illustrates a flow diagram of a method of passing event information between event handling programs.

In contrast, the prior art of FIG. 1 illustrates that the first event handling program (current context) stops execution in order for the second event handling program (future context) to process and set its own event mask register. Then, after the second event handling program (future context) finishes, the first event handling program (current context) continues processing. As described previously, the prior art systems increase system overhead due to context switching and cause delays in processing. The present invention advantageously allows the current context to continue processing and, as such, decreases system overhead and reduces delays incurred in changing the event sensitivity of the future context.

One skilled in the art should know that the present invention is not limited to receiving event mask data and context select data in separate steps. In other embodiments, the event mask data and the context select data may be receive at the same time or in the same step. Also, other embodiments of the present invention may have additional or fewer steps than described above.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

Although the present invention has been described in detail, those skilled in the art should understand that they can make various changes, substitutions and alterations herein without departing from the spirit and scope of the invention in its broadest form.

What is claimed is:

1. A system, operable with a multi-context processor, for allowing a current context to change an event sensitivity of a future context, comprising:
   a context control register, accessible to said current context, for receiving event mask data defining said event sensitivity of said future context, wherein said context control register further receives context select data defining said future context; and
   a context controller, associated with said context control register and invokable from within said current context, that causes said event mask data of said context control register to be employed in creating a content of an event mask register of said future context without necessitating a context switch, and wherein said context controller further causes said context select data to be employed in determining said future context
   wherein said context select data defines said future context or said current context, and
   wherein said multi-context processor is selected from the group consisting of:
      a media access controller,
      a wireless media access controller,
      a microprocessor, and
      a RISC processor.

2. The system as recited in claim 1 wherein said context controller causes said event mask data to be transferred from said context control register into said event mask register, wherein said context control register is not a global register.

3. The system as recited in claim 1 wherein said context controller causes said event mask data to be employed in defining said content of said event mask register of said future context as said multi-context processor switches to said future context.

4. The system as recited in claim 1 wherein said context controller creates said content of said event mask register of said future context without causing a context switch.

5. A method, operable in a multi-context processor, for allowing a current context to change an event sensitivity of a future context, comprising:
   receiving event mask data defining said event sensitivity of said future context from said current context, wherein said receiving includes receiving context select data defining said future context; and
   causing said received event mask data to be employed in creating a content of an event mask register of said future context and said event mask data of said future context being invokable from within said current context without necessitating a context switch, wherein said causing includes causing said context select data to be employed in determining said future context, wherein said context select data defines said future context or said current context, and
   wherein said multi-context processor is selected from the group consisting of:
      a media access controller,
      a wireless media access controller, a microprocessor, and
a RISC processor.

6. The method as recited in claim 5 wherein said causing includes causing said event mask data to be transferred into said event mask register, wherein said context control register is not a global register.

7. The method as recited in claim 5 wherein said causing includes causing said event mask data to be employed in defining said content of said event mask register of said future context as said multi-context processor switches to said future context.

8. The method as recited in claim 5 wherein said defining of said content of said event mask register of said future context occurs without causing a context switch.

9. A wireless media access controller having multiple contexts, comprising:
   a modem/radio interface that transmits and receives data and control information via an external modem and radio;
   a host interface that communicates with an external host in a particular protocol;
   a system memory for storing instructions, data and control information;
   an instruction decoder that decodes instructions received into said wireless media access controller and corresponding to said multiple contexts;
   a plurality of registers sets, corresponding to said multiple contexts, that contain operands to be manipulated;
   an execution core, coupled to said instruction decoder and said plurality of register sets, that executes instructions corresponding to a current context to manipulate ones of said operands; and
   a subsystem for allowing said current context to change an event sensitivity of a future context, having:
      a context control register, accessible to said current context, for receiving event mask data defining said event sensitivity of said future context, wherein said context control register further receives context select data defining said future context; and
      a context controller, associated with said context control register and invokable from within said current context, that causes said event mask data of said context control register to be employed in creating a content of an event mask register of said future context without necessitating a context switch, said context controller further causes said context select data to be employed in determining said future context, wherein said context select data defines said future context or said current context, and
   wherein said multi-context processor is selected from the group consisting of:
      media access controller,
      a wireless media access controller,
      a microprocessor, and
      a RISC processor.

10. The wireless media access controller as recited in claim 9 wherein said context controller causes said event mask data to be transferred from said context control register into said event mask register, wherein said context control register is not a global register.

11. The wireless media access controller as recited in claim 9 wherein said context controller causes said event mask data to be employed in defining said content of said event mask register of said future context as said multi-context processor switches to said future context.

12. The wireless media access controller as recited in claim 9 wherein said context controller creates said content of said event mask register of said future context without causing a context switch.

13. A system, operable in a multi-context processor, for allowing a current context to change an event sensitivity of a future context, comprising:
   a context control register, accessible to said current context, for receiving event mask data defining said event sensitivity of said future context; and
   a context controller, associated with said context control register and invokable from within said current context, that causes said event mask data of said context control register to be employed in creating a content of an event mask register of said future context without necessitating a context switch,
   wherein said context control register further receives context select data defining said future context, and said context controller further causes said context select data to be employed in determining said future context,
   wherein said context select data defines said future context or said current context, and
   wherein said multi-context processor is selected from the group consisting of:
      a media access controller,
      a wireless media access controller,
      a microprocessor, and
      a RISC processor.

* * * * *